US008103377B1

(12) United States Patent
Wong et al.

(10) Patent No.: US 8,103,377 B1

(45) Date of Patent: Jan. 24, 2012

(54) METHOD AND APPARATUS FOR DETERMINING THE USABILITY OF OVERAGE UNITS IN A SORTATION PROCESS

(75) Inventors: Cherie G. Wong, Seattle, WA (US); David Allen Rue, Lexington, KY (US)

(73) Assignee: Amazon Technologies, Inc., Reno, NV (US)

( * ) Notice: Subject to any disclaimer, the term of this patent is extended or adjusted under 35 U.S.C. 154(b) by 653 days.

(21) Appl. No.: 12/248,728

(22) Filed: Oct. 9, 2008

(51) Int. Cl.
*G06F 7/00* (2006.01)
*G06F 17/50* (2006.01)
*B65G 1/00* (2006.01)

(52) U.S. Cl. ......... 700/216; 700/214; 700/217; 700/219

(58) Field of Classification Search ........................ None
See application file for complete search history.

(56) References Cited

U.S. PATENT DOCUMENTS 5,363,310 A 11/1994 Haj-Ali-Ahmadi et al.
5,406,770 A 4/1995 Fikacek
5,720,157 A 2/1998 Ross
5,794,789 A 8/1998 Payson et al.
6,061,607 A * 5/2000 Bradley et al. ................ 700/216
6,478,144 B1 11/2002 Sweazy
2006/0278501 A1 12/2006 Sweazy
2009/0222129 A1 * 9/2009 Waddington et al. ......... 700/216

* cited by examiner

*Primary Examiner* — Gene Crawford
*Assistant Examiner* — Yolanda Cumbess
(74) *Attorney, Agent, or Firm* — Robert C. Kowert; Meyertons, Hood, Kivlin, Kowert & Goetzel, P.C.

(57) ABSTRACT

Various embodiments of a method and apparatus for determining the usability of overage units in a sortation process are described. The embodiments described herein may include a control system of an order fulfillment center. For each unit of multiple units picked from inventory in an order fulfillment center, the control system may be configured to determine whether the given unit is designated to be inducted into a sortation system for sorting units of items into shipments. The control system may be configured to determine an overage unit of a particular item. The control system may also be configured to dynamically determine one or more incomplete shipments that each requires at least one unit of the particular item in order to become a completed shipment. Once such incomplete shipments are determined, the control system may generate an instruction to induct the unit into the sortation system.

54 Claims, 9 Drawing Sheets

METHOD AND APPARATUS FOR DETERMINING THE USABILITY OF OVERAGE UNITS IN A SORTATION PROCESS

BACKGROUND

In a distribution system, a retailer or other product distributor (which may collectively be referred to as distributors) typically maintains an inventory of various units of items at one or more distribution centers, fulfillment centers, cross-docking facilities, materials handling facilities or warehouses (which may collectively be referred to herein as materials handling facilities). The inventory units are ordered from one or more vendors, received at the materials handling facilities as inbound shipments, and stocked in inventory of the materials handling facilities. In an order fulfillment process, orders for units of items may be received from customers of the distributor. Units of the ordered items are picked from various locations in the inventory in the materials handling facilities, processed for shipping, and shipped as outbound shipments to the customers.

The order fulfillment process may include a sortation process, in which units of items picked for orders are sorted into their respective orders. For example, requests (e.g., orders) for units of items from requestors may be divided among multiple pickers, who then pick units corresponding to the requests. The orders may be subdivided among the pickers; therefore, two or more of the pickers may pick units for one order. Consequently, a sort operation to select the proper units of items for given orders from the aggregations of units returned by each respective picker is required. Conventionally, sorting may be performed using automated sorting mechanisms or manual sorting systems. Automated sorting mechanisms for sorting certain types of inventory units according to individual orders include, but are not limited to, the Crisplant® sorter, Eurosort® sorters, and automated sorting mechanisms offered by other vendors. Using an automated sorting mechanism, incoming picked units of items for multiple different customer orders are received at the automated sorting mechanism and sorted by the automated mechanism according to individual orders.

Picking Errors

Whether automated or manual techniques (or some combination thereof) are employed to pick units from inventory prior to sortation, picking errors can occur when the units are incorrectly picked from inventory. For example, an operator may mistakenly pick an incorrect unit from inventory, such as might be the case when units of similar (yet to some extent different) items are located proximate to each other in inventory. For example, an operator may be instructed to pick a book that is part of a series of volumes. As is often the case with a multi-volume series of books, each book may look strikingly similar while being differentiated by a few easily overlooked features, such as a volume number printed on the cover and/or spine of the book. In this example, an agent may mistakenly pick the wrong volume of a multi-volume series of books.

While various embodiments are described herein by way of example for several embodiments and illustrative drawings, those skilled in the art will recognize that various embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of various embodiments as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a method and apparatus for determining the usability of overage units in a sortation process are described. The embodiments described herein may include a control system of an order fulfillment center. The control system may be configured to direct the flow of units throughout the order fulfillment center. For each unit of an item of multiple units picked from inventory in an order fulfillment center, the control system may be configured to determine whether the given unit is designated to be inducted into a sortation system for sorting units of items into shipments. The control system may be configured to determine an overage unit of a particular item (e.g., a particular unit of a particular item of the multiple units that is not designated to be inducted into the sortation system). The control system may also be configured to dynamically determine one or more incomplete shipments that each requires at least one unit of the particular item in order to become a completed shipment. Once such incomplete shipments are determined, the control system may generate an instruction to induct the unit into the sortation system. In various embodiments, the control system may also assign the overage unit to a particular one of the determined incomplete shipments. The terms "unit" and "item" are used distinctively throughout this disclosure. More specifically, the term "item" refers to an item in the abstract (e.g. a particular type of television) and does not refer to any particular one of such items; the term "unit" is used to refer to a particular instance of the particular item (e.g., a particular one of such televisions). For example, twenty portable music players may all be the same item (e.g., as identified by model number) whereas each of such twenty portable music players may be a distinct unit (e.g., as identified by serial number).

Figure 1:
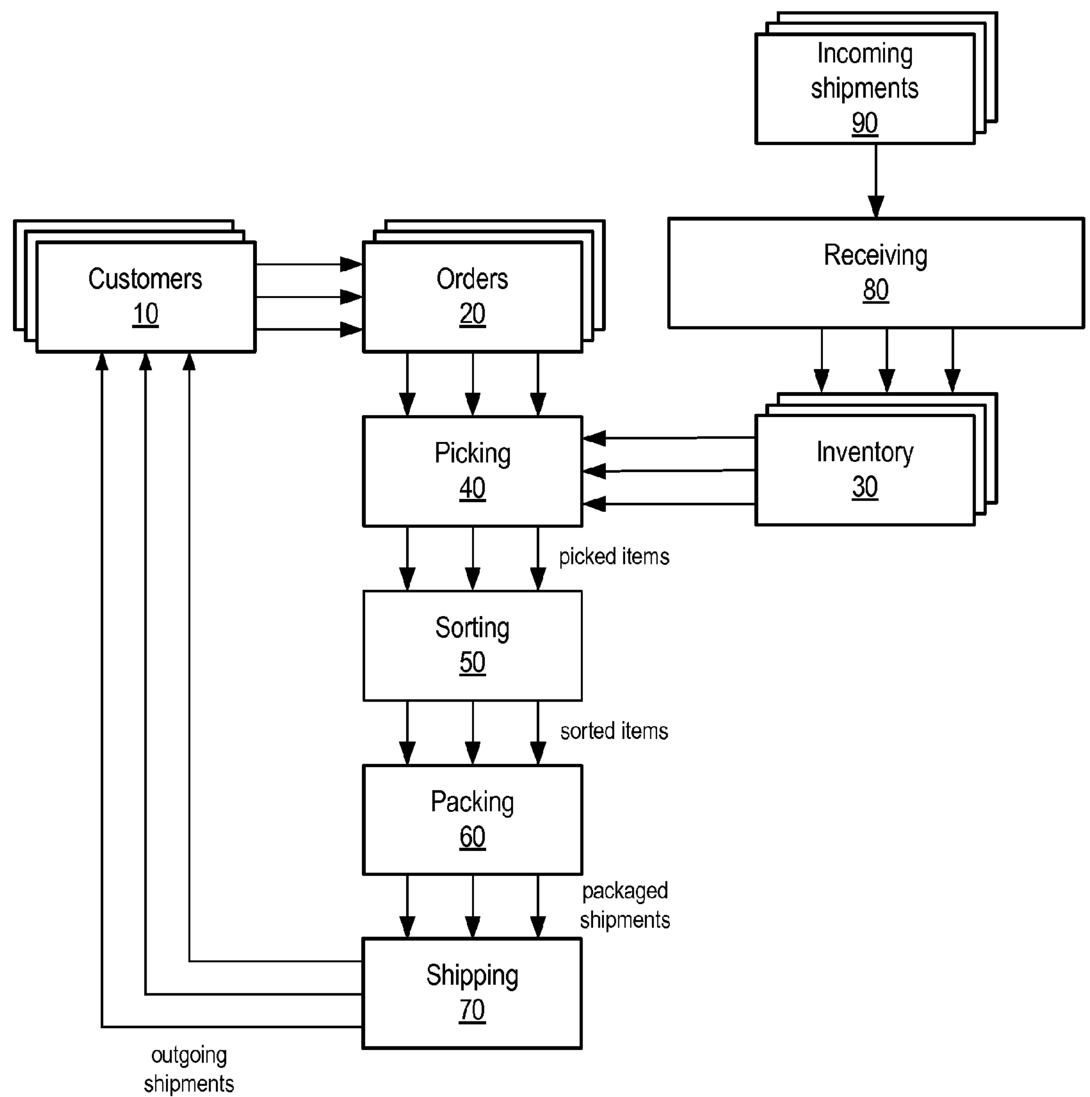
FIG. 1 illustrates a logical representation or view of the operation of a materials handling facility in which embodiments of control system may be implemented, according to some embodiments.

FIG. 1 illustrates a logical representation or view of the operation of a materials handling facility in which embodiments of the control system may be implemented. For example, this Figure may illustrate an order fulfillment center of a product distributor. Multiple customers 10 may submit orders 20 to the product distributor, where each order 20 specifies one or more units from inventory 30 to be shipped to the customer that submitted the order. To fulfill the customer orders 20, the one or more given units specified in each order may be retrieved, or picked, from inventory 30 (which may also be referred to as stock storage) in the materials handling facility, as indicated at 40. Picked units may be delivered or conveyed, if necessary, to one or more stations in the materials handling facility for sorting 50 into their respective orders, packing 60, and finally shipping 70 to the customers 10. In various embodiments, picked units of items may be delivered to an induction station, where the units are inducted into a sorting system (e.g., a sorting mechanism, sorting process, or some combination thereof). The units of items may then be routed to particular destinations in accordance with the requests (orders) currently being processed, e.g. to sorting stations, under direction of the control system. Various sorting mechanisms and processes (which may be represented by sorting 50) are described in more detail below. A picked, packed and shipped order does not necessarily include all of the units ordered by the customer; an outgoing shipment to a customer may include only a subset of the ordered units available to ship at one time from one inventory-storing location. In other cases, units of the order may be split into multiple shipments for a variety of reasons including but not limited to space and/or economic efficiency. For instance, shipping a set of unit in three small shipments may be less expensive than shipping the set of units in one large shipment.

A materials handling facility may also include a receiving 80 operation for receiving shipments of stock from one or more sources (e.g., vendors) and for placing the received stock into stock storage. The receiving 80 operation may also receive and process returned or rented units from customers. At least some of these units are typically returned to inventory 30. The various operations of a materials handling facility may be located in one building or facility, or alternatively may be spread or subdivided across two or more buildings or facilities.

Figure 2:
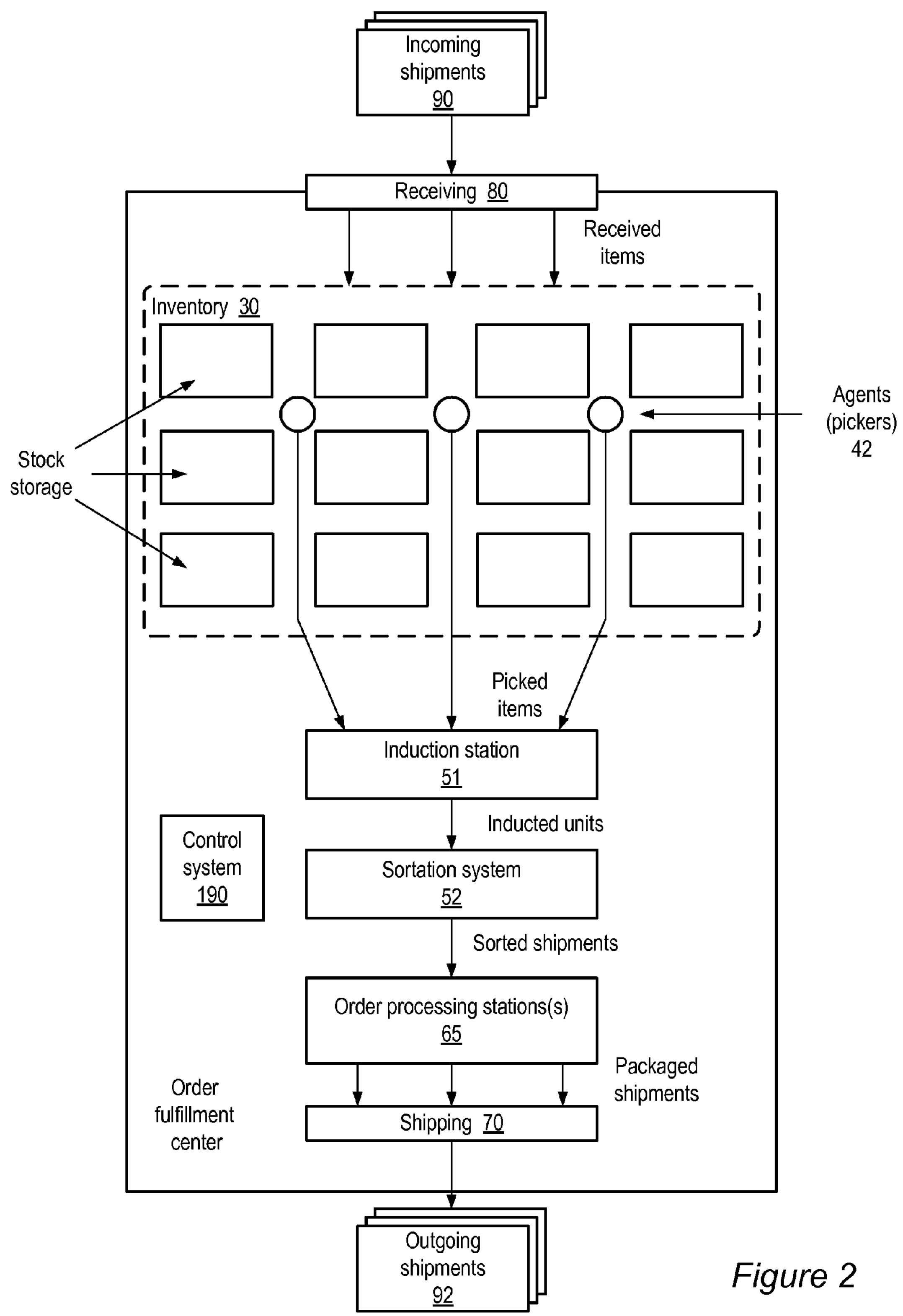
FIG. 2 illustrates an exemplary representation of an order fulfillment center, according to some embodiments.

FIG. 2 illustrates an example of a physical layout of a materials handling facility, such as an order fulfillment facility or center, in which embodiments of the control system may be implemented. At any one time, one or more agents 42 of the distributor may each be picking units of items from inventory 30 to fulfill portions or all of one or more requests or orders. This may result in multiple units of items (e.g., a stream of units and/or batches of picked units) for multiple incomplete or complete orders, which may then be delivered to an induction station 51 for sortation system 52, which may include sorting mechanisms and/or sorting processes for sorting units of items into respective shipments of units. For example, in some embodiments, the induction point may refer to a station where units may be inducted into a conveyance mechanism for conveying units of items to sorting stations configured for sorting units of items into respective shipments. In another example, the induction point may refer to a station where units may be inducted into a conveyance mechanism of an automated sorter (e.g., a Crisplant® sorter).

In some embodiments, the conveyance mechanism (under direction of the control system) may then deliver the units to various order processing stations 65, which may include one or more packing stations, in the materials handling facility for processing prior to shipping 70. Portions of an order may be received from the pickers 42, or from other stations, at a processing station 65 at different times, so processing at a station may have to wait for one or more units for some orders to be delivered to the station from picking and/or from another station before completion of processing of the orders at the station. The picked units of items delivered to a processing station via a conveyance mechanism may be processed at a processing station 55, for example sorted into their respective orders at a sorting station under direction of the control system. Once the processing of units for an order is completed at a station, the units may be delivered to another station for further processing, for example to a sorting station to be sorted into orders, or to a packing station to be packaged for shipping 70.

An order fulfillment center may also include one or more receiving 80 operations for receiving shipments 90 of stock from various vendors. The received stock may then be placed into stock storage. The receiving 80 operation may also receive and process returned, purchased, or rented units from customers. The various operations and stations of an order fulfillment center may be located in one building or facility, or alternatively may be spread or subdivided across two or more buildings or facilities.

In various embodiments, control system 190 may generate and/or maintain a stored indication of the state of each unit within the order fulfillment center (e.g., each unit might have its own record in a database of the control system). For example, such a stored indication may indicate, for each of one or more of the units within the order fulfillment center, the location of the unit (e.g., storage, induction station, sortation system, order processing station, etc.) and/or the fulfillment process that the unit is currently undergoing (e.g., induction, sorting, packing, shipping, etc.).

Figure 3A:
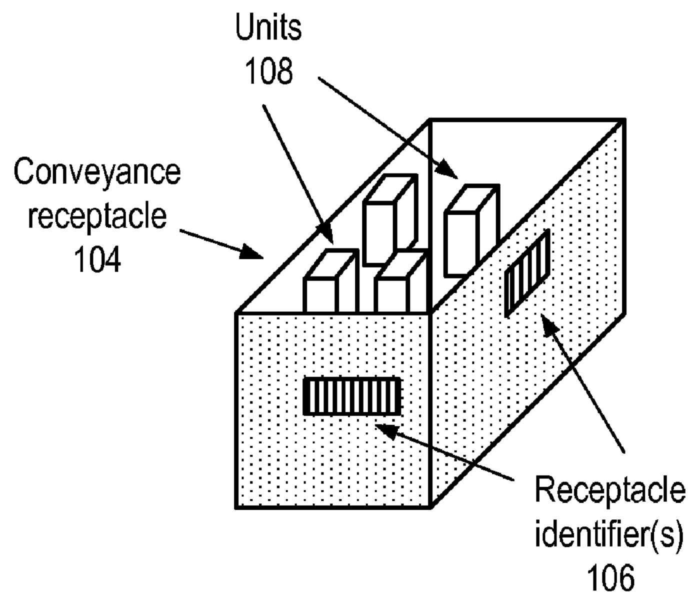
FIGS. 3A-B illustrate exemplary representations of conveyance receptacles configured to carry units of items, according to some embodiments.

In various embodiments, units of items may be picked from inventory and delivered to induction station 51 by agents, which may include human operators and/or automated mechanisms. In some cases, streams or flows of units may be delivered to induction station 51. In other cases, units may be delivered to induction station 51 as a batch of units. For instance, a picker may pick a batch of units from inventory and deliver the batch of units to the induction station in a cart or other receptacle. In some cases, batches of units may be delivered to the induction station in a tray, container, or tote (referred to herein as a conveyance receptacle), such as illustrated by FIG. 3A. To assist the control system in identifying a given receptacle, each receptacle 104 may also include a receptacle identifier 106 as demonstrated by the illustrated embodiment. While not illustrated, each unit 108 may include its own unique identifier as well. In other cases, each unit 108 may include an item identifier. In various embodiments, the control system may monitor and track the particular units that are located within a given conveyance receptacle 104.

Figure 3B:
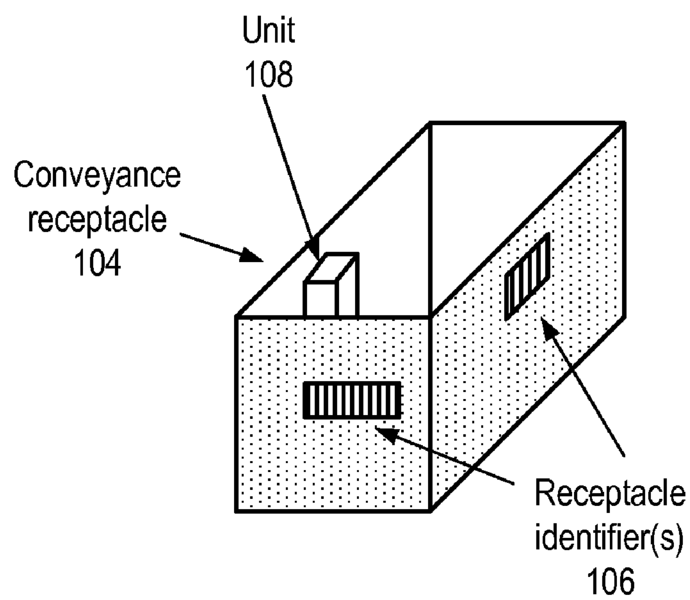

In some embodiments, units may be "singulated" into conveyance receptacles such that each of such conveyance receptacles includes only one unit. In these cases, the control system may track units based on the identifier of the receptacle in which the unit is located. Since in these cases only one unit is placed in a given receptacle, the use of a separate item identifier or unit identifier may be bypassed (e.g., the control system may generate or maintain one or more records that associates a given unit to a given receptacle in which the unit is located). FIG. 3B illustrates the above described configuration. For instance, in the illustrated embodiment, conveyance receptacle 104 includes only one unit 108.

In various embodiments, units may be transported throughout the order fulfillment center within respective conveyance receptacles. For instance, in some embodiments, each unit of an item may be placed into a conveyance receptacle, such as a tray, container, or tote. The conveyance receptacle may be associated with a receptacle identifier that uniquely identifies the conveyance receptacle in the materials handling facility. For example, each conveyance receptacle may be marked with a bar code or Radio Frequency Identifier (RFID). A unit placed into a conveyance receptacle is associated with the conveyance receptacle, for example by reading or scanning an item identifier from the unit and the receptacle identifier from the receptacle. In some cases, conveyance receptacles may be "floating" because of their non-linear relationship to each other and to automated equipment. In such cases, conveyance receptacle may not be fixed to or fixed components of any automated equipment, and each conveyance receptacle may have a non-linear relationship to other conveyance receptacles active in the system (i.e., there is no necessary ordering of conveyance receptacles). Conveyance receptacles may be removed from or added to the system, and may be arbitrarily arranged on the sortation system. Conveyance receptacles may be removed from or added to the system at various locations on the path of the conveyance mechanism, for example at induction stations, sorting stations, or at other locations, as necessary or desired. Further, a variety of automated equipment may be used in implementing automated conveyance of the conveyance receptacles; the use of conveyance receptacles that may each be associated with individual units of items as described herein does not depend on the use of any particular automated equipment to convey the receptacles and/or to sort the units contained therein into respective orders.

In various embodiments, control system 190 described herein may be configured to track which units are located within which conveyance receptacles within the order fulfillment center. Additionally, units 108 may be coupled and decoupled from conveyance receptacles while in the order fulfillment center. For instance, in one example, a batch of units may be transported to induction station 51 in the same container and later placed in different individual containers if inducted into the sortation system. The control system 190 may, at any given moment, determine the particular units within a given conveyance receptacle. In some cases, the control system may store such information in one or more databases for later retrieval.

Figure 4:
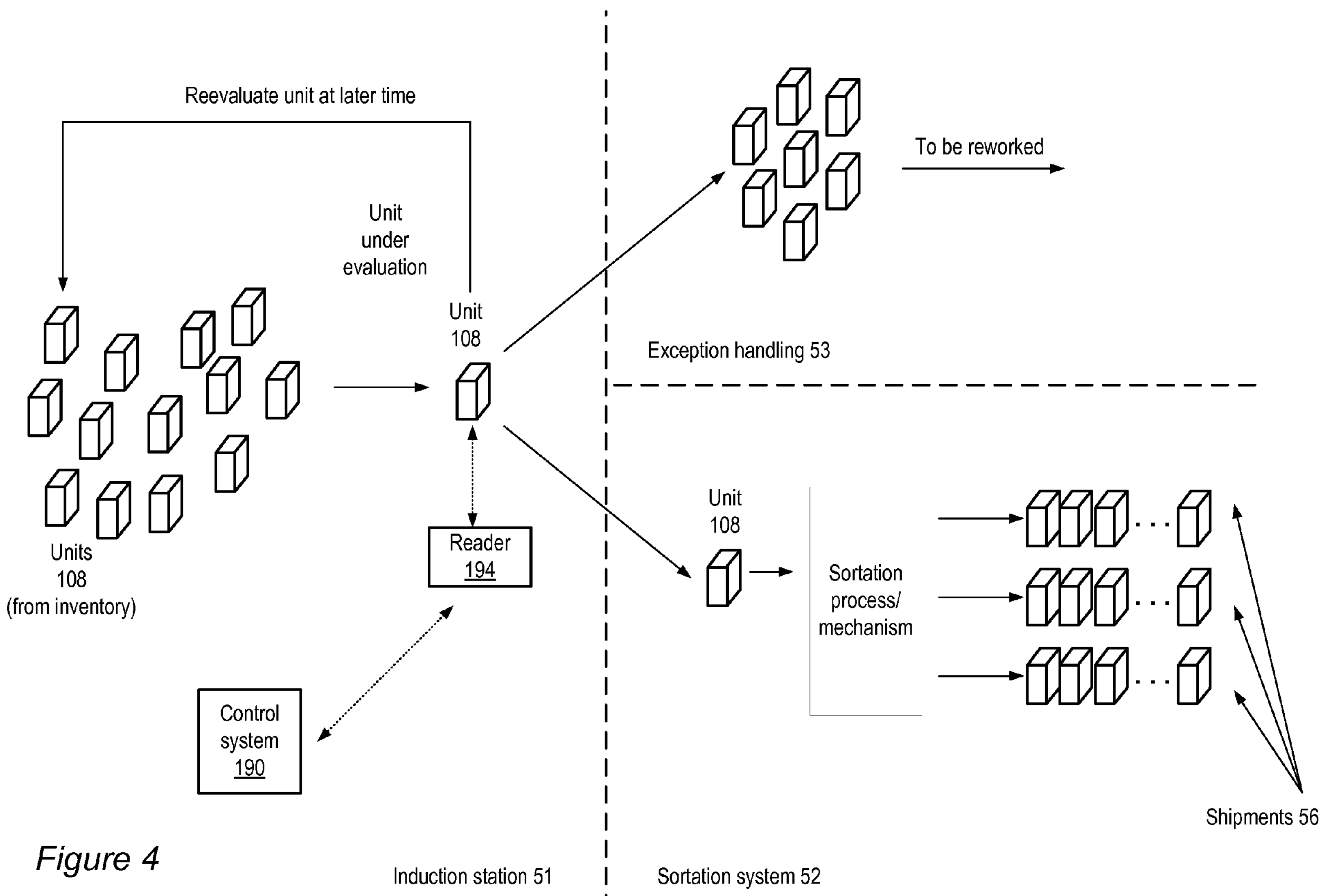
FIG. 4 illustrates an exemplary logical representation of the flow of units at an induction station of a sortation system, according to some embodiments.

In any case, units arrive from inventory at induction station 51 to be inducted into sortation system 52. FIG. 4 illustrates one example of the induction of units, such as units 108, into sortation system 52. While not illustrated in FIG. 4, units 108 may in some embodiments be conveyed throughout the order fulfillment center in one or more conveyance receptacles, such as illustrated above with respect to FIGS. 3A and 3B. In other cases, such units may not be transported in such conveyance receptacles. For instance, such units may travel on a conveyor belt or some other conveyance mechanism. In the illustrated example (as is the case in various embodiments), control system 190 may determine whether a given unit 108 is to be inducted into sortation system 52.

For a given unit undergoing evaluation, the control system may determine whether such unit is to be inducted into sortation system 52. In various embodiments, to determine whether such unit is to be inducted into the sortation system, the control system may determine whether the unit was previously designated to be inducted into the sortation system. For instance, determining whether a given unit is designated to be inducted into a sortation system may include determining an identifier for the given unit and comparing such identifier to a list or record of units designated to be inducted into the sortation system. In some embodiments, such a list or record may specify one or more shipments and the corresponding units that make up such shipments. If the identified unit is present with such list or record, the control system may determine that the unit is designated to be inducted into the sortation system. Accordingly, the control system may direct the unit to sortation system 52 for shipment sorting.

Alternatively, any given one of units 108 may be an "overage" unit, which may be a unit that is not designated to be inducted into the sortation system. Overage units may include units that were mistakenly delivered to the induction station. For example, an agent may have picked the wrong unit from inventory. In some embodiments, units may be transported from inventory in one or more receptacles; overage units may include units that are mistakenly present within such receptacles. For example, as a receptacle travels from inventory to induction station 51, a unit may become an overage unit by falling into such a receptacle by error. For instance, units in inventory may be stored on shelving units. In such a case, units may be accidentally knocked off the shelf and into a passing receptacle. Irrespective of the element used to deliver units to the induction station (e.g., agents, receptacles, conveyance mechanisms, etc), control system 190 may be configured to monitor units as they are traveling to the induction station. Accordingly, any unit that arrives at induction station 51 and is not recognized by control system 190 may be considered an overage unit in various embodiments.

To evaluate each of units 108 and determine whether a given unit 108 is to be inducted into the sortation system, control system 190 may obtain information about unit 108 through one or more a fixed, mobile, or hand-held readers, such as the illustrated reader 194 (which may be a component of control system 190 or a separate component configured to communicate with control system 190). In various embodiments, each of units 108 may have an identifier that reader 194 is configured to read. In some embodiments, such identifier may be unique to the particular unit. The reader may determine such identifier and provide the identifier to control system 190 for further analysis (e.g., for determining whether the unit is to be inducted into the sortation system).

In some embodiments, control system 190 may be configured to determine or derive an identifier for a given unit 108 from two or more pieces of information. For instance, as described above, each of units 108 may in various embodiments be transported throughout the order fulfillment center within one or more conveyance receptacles. Accordingly, in some embodiments, control system 190 may determine an identifier for a given unit 108 based on an item identifier for the unit (e.g., an identifier that is unique to the item but not necessarily unique the particular unit) and an identifier of the receptacle in which the particular unit is located. For example, to determine an identifier for a given unit, the control system might concatenate or perform some other algorithm on such item identifier and such receptacle identifier to derive or generate a unit identifier.

Sortation system 52 may be configured to sort inducted units into respective shipments, such as shipments 56, which may be packaged and sent to customers. In various embodiments, inducted units are sorted unit by unit into such shipments. Shipments that have not been completely sorted by the sortation process may be referred to herein as incomplete shipments. For example, if there are ten units in a given shipment to be sorted by the sortation system, the shipment may be considered to be incomplete while the shipment contains any number of units less than ten. A shipment is considered to be a completed shipment once all units of the shipment have been sorted into the same shipment by the sortation system. Control system 190 may be configured to determine any incomplete shipment undergoing sorting by the sortation process. Additionally, the control system may be configured to determine any unit required by the sorting system to complete a given order. In many cases, such units are already in process. For instance, an agent may have a pick order to pick such units, may currently be picking such units, or may be sending such units to the induction point. In any of such cases, instead of waiting for such units to be evaluated by the control system at the induction station, the control system determining whether an overage unit is eligible to be applied to an incomplete shipment and inducting such unit to be sorted into such shipment can improve efficiency and the rate at which shipments are processed within the order fulfillment center. Determining whether an overage unit is eligible to be applied to one or more shipments that are being sorted by sortation system 52 may include determining whether at least one incomplete shipment lacks a unit of a particular item that is the same as the item of the overage unit. If there is a match with at least one incomplete shipment, the control system may determine that the overage unit is to be inducted into the sortation system. If there is not a match (i.e., there is no incomplete shipment that lacks a unit of the particular item that is the same as the item of the overage unit), then the control system may determine that the overage unit is not to be inducted into the sortation system at that time. Accordingly, the control system may direct the overage unit to an exception handling process, such as exception handling stage 53, to be reworked (e.g., placed back into inventory or manually sorted into a shipment). For example, the control system may be configured to generate an instruction to send a particular unit to an exception handling stage if the control system determines that there are currently no incomplete shipments that require a unit of the item. In various embodiments, at some point during the exception handling process, one or more of the units may be evaluated by control system 190 according to the various techniques and methods described herein. For instance, an item sent for rework may again be evaluated for induction according to the same (or similar) logic utilized by control system 190 and/or reader 194 as illustrated in FIG. 4. In some embodiments, a given unit at the exception handling phase may be manually sorted to an existing shipment. In some embodiments, if no existing shipments require such item, the shipment may be held at the exception handling phase until a shipment that requires such unit is created (at which point the unit may be sorted to that shipment). For example, while the unit resides in the exception handling stage, the control system may generate an instruction to induct the unit into the sortation system where the unit will be sorted to a respective shipment that requires the unit in order to become a completed shipment.

In some cases, the control system may direct the overage unit to be held at the induction station for evaluation at a later time instead of sending the overage unit to the exception handling stage. For example, as the composition of incomplete shipments within the order fulfillment center changes over time, an overage unit that previously was not needed by at least one shipment may now be needed by a new incomplete shipment.

If the control system determines that the overage unit is to be inducted into the sorting system, the control system may generate one or more instructions to induct the overage unit into the sorting system. In various embodiments, such instructions may include instructions to agents or instructions to automated mechanisms configured to induct units into the sortation system. For instance, reader 194 may include a display and the control system may generate an instruction to an agent that is using the reader. To generate such instruction, the control system may generate a user-interface display on the reader (or any other device accessible by an agent). Such display may include a message such as "induct overage unit" or some other similar message. In this case, the agent may view the message and follow the appropriate procedure for inducting the unit into the sortation system. In other cases, the generated instruction may include one or more commands to automated or mechanized systems, such as a conveyance mechanism or induction mechanism responsive to such commands. For instance, the control system may generate the instruction to induct the overage unit and provide such instruction to a conveyance mechanism configured to transport the unit. In response to the instruction, the conveyance mechanism may deliver the overage unit to sortation system 52, which then sorts the unit to a shipment that needs the overage unit.

Figure 5:
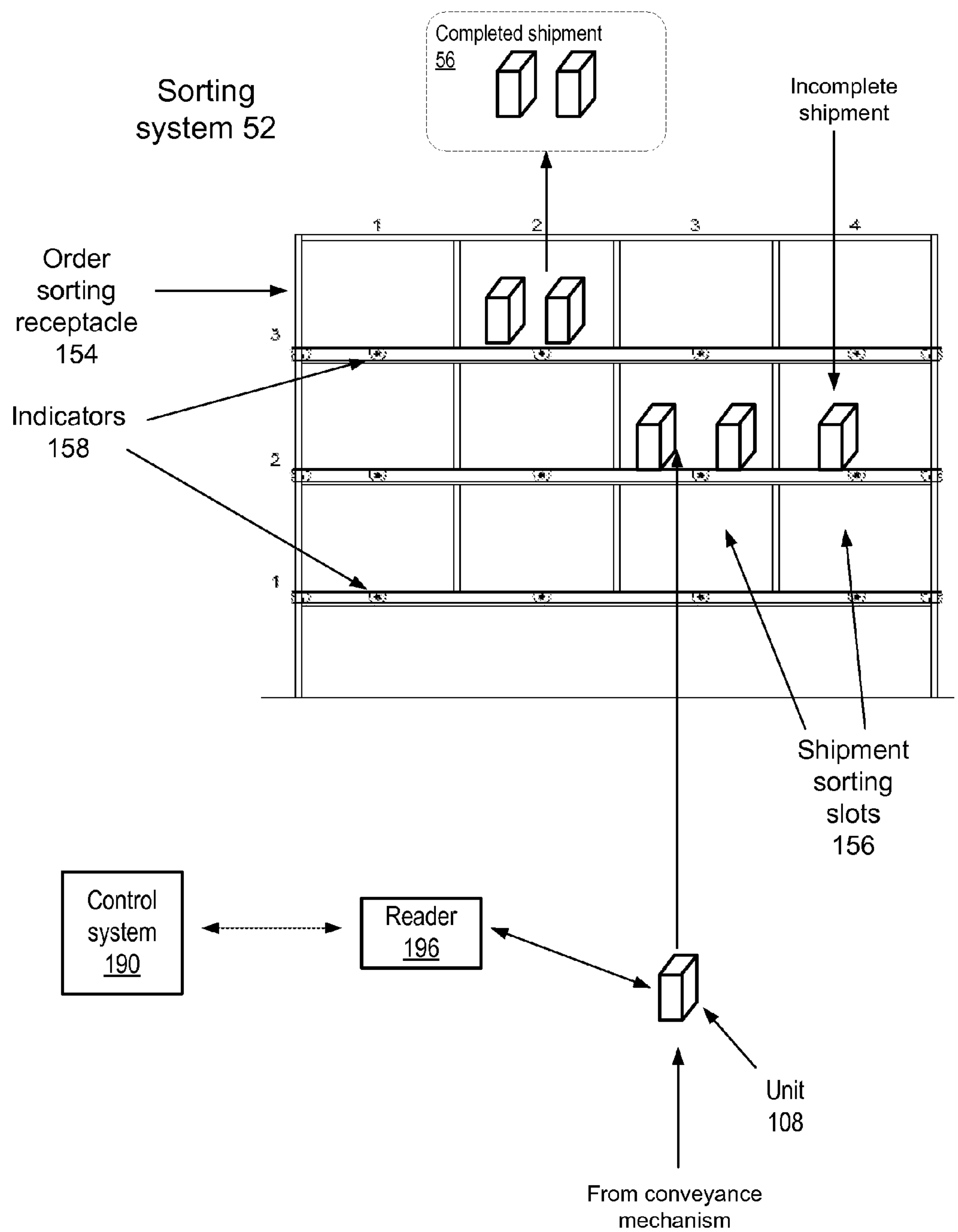
FIG. 5 illustrates an exemplary representation of an order sorting receptacle including multiple shipment sorting slots, according to some embodiments.

In cases where the sortation system includes an automated sorter, such as a Crisplant® or similar sorter, the overage unit may be sorted to a respective shipment according to the sorting logic of the automated sorter. In other cases (such as in embodiments where the sortation system does not include such an automated sorter), the control system may select the particular incomplete shipment to which an overage unit is to be applied from multiple incomplete shipments that need the overage unit (e.g., multiple incomplete shipments that currently require at least one unit of the particular item of the overage unit). In some embodiments, as illustrated in FIG. 5, an order sorting receptacle 154 that includes multiple shipment sorting slots 156 for sorting units into respective shipments is utilized by the sortation system. For instance, a conveyance mechanism under the control of the control system may deliver inducted units to an agent stationed at order sorting receptacle 154. The control system may detect the presence of a unit delivered by the conveyance mechanism by scanning the unit with one or more a fixed, mobile, or handheld readers, such as the illustrated reader 196 (which may be a component of control system 190 or a separate component configured to communicate with control system 190). In some cases, an agent may initiate the identification of an incoming unit 108 with reader 196. In other cases, control system 190 may control reader 196 such that the reader automatically identifies unit 108 without the need for agent intervention. The control system may direct (e.g., via one or more notifications or instructions generated by the control system) an agent or automated mechanism to place an incoming unit 108 to a particular shipment slot 156 of the order sorting receptacle. Note that the control system may associate various shipments to respective shipment sorting slots in the order sorting receptacle. The order sorting receptacle may include one or more indicators such as indicators 158. The indicator 158 may be a light, an audio signal, or some other mechanism or combination of mechanisms capable of conveying audible, visual, and/or other information to a human operator. As an alternative, or in addition, to indicators 158 physically located proximate to shipment sorting slots 156 on sorting bin 154, textual and/or graphical unit placement directions may be displayed on a monitor of a computer, hand-held device, etc., or printed to paper output for agents. In various embodiments, an instruction generated by the control system may include the control system activating (e.g., illuminating an indicator light) an indicator 158 that corresponds to a particular shipment sorting slot. In this way, the control system may instruct an agent to which shipment sorting slot an incoming unit should be placed (and thus to which shipment to which the unit is to be sorted).

As used herein, an "incomplete shipment" may include any shipment currently under the control of the control system, irrespective of whether any units have been successfully sorted for such shipment. As used herein, a "partially-sorted shipment" may include any shipment for which (a.) at least one unit has been successfully sorted and (b) at least one other unit is required to complete the sorting of such shipment. As used herein, a "completed shipment" may include any shipment that has been completely sorted (e.g., all units of the shipment have been grouped together, such as in a shipment sorting slot). Various additional tasks may be performed on a completed shipment within the order fulfillment center, including but not limited to gift wrapping, packaging, and shipping.

As described above, when an overage unit is detected, the overage unit may be eligible to be applied to multiple incomplete shipments. In other words, each of such shipments may require at least one unit of the item in order to become a complete shipment; the overage unit may be sorted to any one of such shipments. Since a given unit can only be sorted to one shipment of such multiple incomplete shipments, the control system may be configured to determine to which of such multiple incomplete shipments the unit should be sorted. In various embodiments, control system 190 may determine to which incomplete shipment an overage unit is to be assigned based on one or more selection criteria, which are described in more detail below. The selection criteria may be dynamically configured (e.g., weighted according to configurable weighting values) by the control system or an administrator.

In some embodiments, an overage unit inducted into the sortation system may take the place of another unit for which an inventory pick instruction has been issued. For example, with respect to the shipment to which an overage unit may be assigned by the control system, an inventory pick instruction may have already been generated for a unit that is the same item as the overage unit. In this case, picking such unit and sending it to the induction station may in some cases be redundant for the shipment since the overage unit of the same item has already been applied to that shipment. Accordingly, the control system described herein may be configured to generate an instruction to cancel a pick operation for the unpicked unit that is the same item as the overage unit.

As described above, control system 190 may determine to which incomplete shipment an overage unit is to be assigned based on one or more selection criteria. In various embodiments, one of the selection criteria may include, for each given incomplete shipment, a measure of whether the given incomplete shipment has already been assigned to a sorting slot, such as the shipment sorting slots 156 described above. For example, since there may be a limited number of sorting slots within the order fulfillment center, assigning an overage unit to a shipment already assigned to a sorting slot (as opposed to assigning the overage unit to a new slot not yet associated with a shipment) may facilitate the completion of such shipment. Note that when the shipment has been completely sorted at in a shipment sorting slot, the shipment can be removed and sent to one or more order processing stations (e.g., gift wrap, packaging) or on to shipping. Accordingly, by assigning overage units to shipments already assigned to a sorting slot, the control system can improve the speed at which shipments are completed and by extension improve the order and shipment throughput of the overall order fulfillment center. To perform the above operations, the control system may in various embodiments generate and/or maintain a stored representation that indicates, for each given sorting slot, the shipments that are assigned to such sorting slot.

In various embodiments, one of the selection criteria may include, for each given incomplete shipment, a measure of whether the given incomplete shipment includes at least one sorted unit. For instance, in the case where shipments are sorted to particular sorting slots, the control system may determine whether the sorting slot associated with the given incomplete shipment contains at least one unit. For example, as agents scan incoming units and place them in the sorting slots (e.g., as directed via the indicators described above), the control system may record the placement of such units and to which slots such units are placed. Note that when the shipment has been completely sorted in a shipment sorting slot, the shipment can be removed and sent to one or more order processing stations or on to shipping. Accordingly, by assigning overage units to shipments having at least one unit in an assigned a sorting slot, the control system can improve the speed at which shipments are completed and by extension improve the order and shipment throughput of the overall order fulfillment center.

In various embodiments, one of the selection criteria may include, for each given incomplete shipment, a measure of whether the given incomplete shipment is short of a complete shipment by only one unit of the particular item. As described above, the order fulfillment center may in some cases have a fixed order or shipment capacity. For instance, in some embodiments, the order or shipment capacity of the order fulfillment center may be constrained by the number of shipment sorting slots in which to sort shipments. Accordingly, by assigning an overage unit to the shipment that is most likely to be completed (as is the case for shipments needing only one more unit to become complete), the control system described herein may improve the order and shipment throughput of the overall order fulfillment center.

In various embodiments, one of the selection criteria may include, for each given incomplete shipment, a measure of whether the sorting of at least one unit designated to be sorted as part the given incomplete shipment was previously postponed due to insufficient availability of one or more resources of the order fulfillment center. Such resources may include but are not limited to sorting slots, labor resources (e.g., agents and mechanical labor), conveyance mechanisms, or any other element of the order fulfillment center. For example, in some cases, insufficient resources may cause delays and backups within the order fulfillment facility. For instance, if all sorting slots of the order fulfillment center are occupied, the conveyance mechanisms may not be able to offload units and may eventually become gridlocked with circulating units. By processing units circulating on the conveyance mechanism, the control system may remove units that are inhibiting the order fulfillment center's ability to process shipments thereby enabling new shipments to be processed.

In various embodiments, one of the selection criteria may include, for each given incomplete shipment, a measure of an amount of time remaining until a specified time at which the given incomplete shipment is scheduled to be shipped as a completed shipment from the order fulfillment center. For instance, such specified time may be the time (and/or date) that the shipment is expected to be at a loading dock to be loaded onto a shipping carrier's truck. For example, given two or more disparate incomplete shipments (all else considered equal), it may be more efficient (with respect to the order or shipment throughput of the order fulfillment center) to assign an overage unit to the shipment that is expected to be shipped before each of the other shipments.

In various embodiments, one of the selection criteria may include, for each given incomplete shipment, a measure of an assigned priority designation of the given incomplete shipment. In various embodiments, such priority designations may be assigned by the control system to various shipments within the order fulfillment center. In some embodiments, such priority designations may include shipping priority designations. For example, a package to be shipped via expedited services (e.g., overnight shipping) may have a higher priority designation than a package to be shipped via standard services (e.g., ground shipping).

Figure 6:
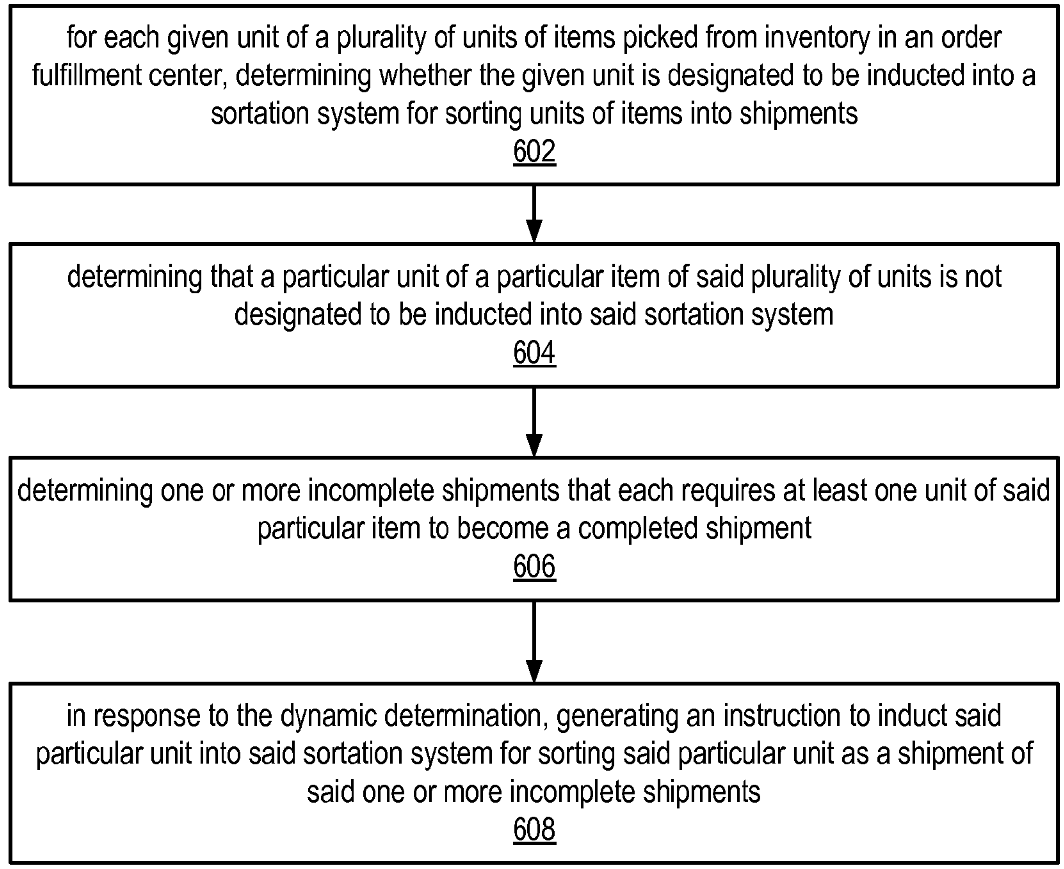
FIG. 6 illustrates a flowchart of an exemplary method for determining whether an overage unit is to be inducted into a sortation system, according to some embodiments.
Figure 7:
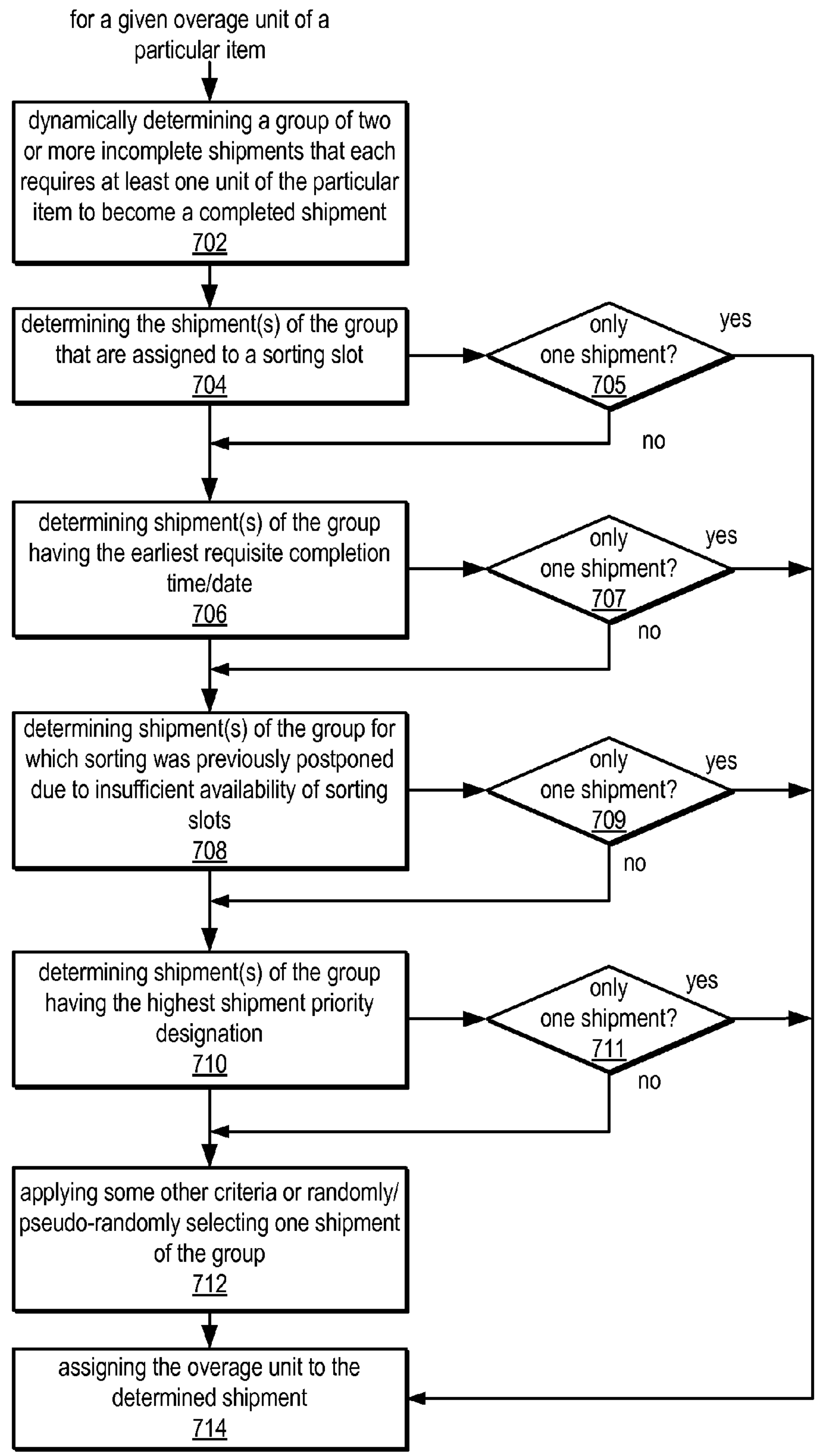
FIG. 7 illustrates a flowchart of an exemplary method for assigning overage units to shipments, according to some embodiments.
Figure 8:
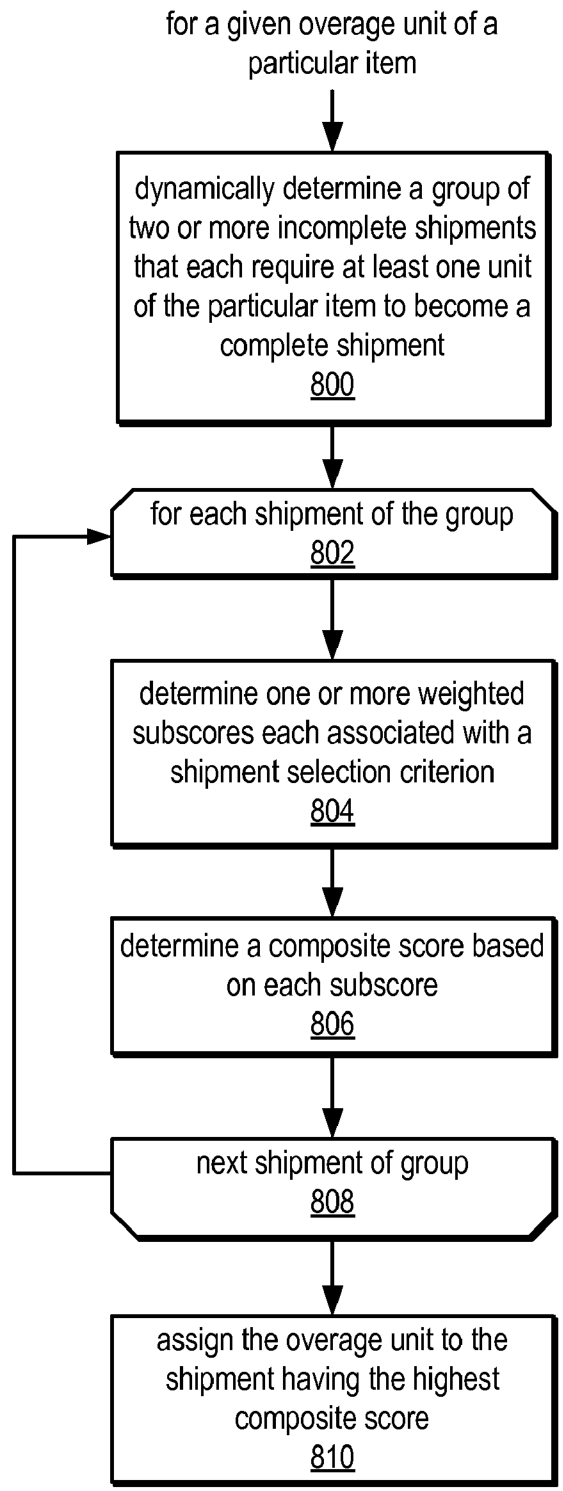
FIG. 8 illustrates another flowchart of an exemplary method for assigning overage units to shipments, according to some embodiments.

Various embodiments of the method and apparatus for dynamically assigning overage units of items to shipments undergoing sortation may include a variety of different methods, such as the exemplary methods of FIGS. 6-8. Note that the illustrated methods may be performed by the control system (e.g., control system 190) described herein. FIG. 6 illustrates a flowchart representing an exemplary method for determining whether overage units are to be inducted into a sortation system (e.g., sortation system 52) (block 602). The illustrated method begins by, for each unit of multiple units picked from inventory in an order fulfillment center, determining whether the given unit is designated to be inducted into the sortation system. In various embodiments, determining whether a given unit is to be inducted into a sortation system may include determining an identifier for the given unit and comparing such identifier to a list or record of units designated to be inducted into the sortation system. In some embodiments, such a list or record may specify one or more shipments and the corresponding units that make up such shipments. If the identified unit is present with such list or record, the control system may determine that the unit is designated to be inducted into the sortation system. In other cases, a given unit under evaluation may be an overage unit (as described above) and thus is not currently designated to be inducted into the sortation system.

For at least one of the units the method may include determining that the particular unit (of a particular item) is not designated to be inducted into the sortation system (block 604). For instance, such unit may be an overage unit. As described above, Overage units may include units that were mistakenly delivered to the induction station. For example, an agent may have picked the wrong unit from inventory. In some embodiments, units may be transported from inventory in one or more receptacles; overage units may include units that are mistakenly present within such receptacles. For example, as a receptacle travels from inventory to an induction station of the sortation system, a unit may become an overage unit by falling into such a receptacle by error. For instance, units in inventory may be stored on shelving units. In such a case, units may be accidentally knocked off the shelf and into a passing receptacle.

The method may further include dynamically determining one or more incomplete shipments that each require at least one unit of the particular item (e.g., an item that matches the item of the overage unit) in order to become a completed shipment (block 606). For example, for the unit that is not currently designated to be inducted into the sortation system, the method may include determine what type of item the unit is. Once the type of item is determined, the method may include evaluating existing shipments to determine any shipments that need at least one unit of such item (e.g., shipments that require at least one unit of such items in order to become completed shipments). In response to determining at least one of such shipments, the method may include generating an instruction to induct the overage unit into the sortation system (block 608). In various embodiments, such an instruction may include instructions to agents or instructions to automated mechanisms configured to induct units into the sortation system. For instance, a reader (e.g., reader 194) may include a display and the method may include generating an instruction to an agent that is using the reader. To generate such instruction, the method may include generating a user-interface display on the reader (or any other device accessible by an agent). Such display may include a message such as "induct overage unit" or some other similar message. In this case, the agent may view the message and follow the appropriate procedure for inducting the unit into the sortation system. In other cases, the generated instruction may include one or more commands to automated or mechanized systems, such as a conveyance mechanism or induction mechanism responsive to such commands. For instance, the method may include generating the instruction to induct the overage unit and providing such instruction to a conveyance mechanism configured to transport the unit.

In some cases, more than one incomplete shipment will require a unit of an item that matches the item of the overage unit (e.g., as determined in block 606). In these cases, the methods described herein may include using one or more selection criteria to select one incomplete shipment to which the overage unit is to be assigned (and/or directed, such as by a conveyance mechanism under the control of a control system). One example of such a method is illustrated by the flowchart of FIG. 8. The illustrated method begins by, for a given overage unit of a particular item, dynamically determining that a group of two or more incomplete shipments that each requires at least one unit of the particular item to become a completed shipment (block 702). The method may include using multiple criteria to single out a single shipment to which the overage unit will be applied, as illustrated in block 704-710 described herein.

As illustrated by block 704, the method may include determining each shipment of the group that is assigned to a sorting slot (e.g., shipment sorting slot 156). For example, since there may be a limited number of sorting slots within the order fulfillment center, assigning an overage unit to a shipment already assigned to a sorting slot (as opposed to assigning the overage unit to a new slot not yet associated with a shipment) may facilitate the completion of such shipment. As described above, note that when the shipment has been completely sorted at in a shipment sorting slot, the shipment can be removed and sent to one or more order processing stations (e.g., gift wrap, packaging) or on to shipping. Accordingly, by assigning overage units to shipments already assigned to a sorting slot, the control system can improve the speed at which shipments are completed and by extension improve the order and shipment throughput of the overall order fulfillment center. As illustrated by block 705, if after the determination of block 704 results in only one shipment, then the method proceeds to block 712. If two or more shipments remain, the method proceeds to block 706.

As illustrated by block 706, the method may include determining each shipment of the group for which sorting was previously postponed due to insufficient availability of shipment sorting slots. For instance, if all sorting slots of the order fulfillment center are occupied, the conveyance mechanisms may not be able to offload units and may eventually become gridlocked with circulating units. By processing shipments including units circulating on the conveyance mechanism, the control system may remove units that are inhibiting the order fulfillment center's ability to process shipments thereby enabling new shipments to be processed. As illustrated by block 707, if after the determination of block 706 results in only one shipment, then the method proceeds to block 712. If two or more shipments remain, the method proceeds to block 708.

As illustrated by block 708, the method may include determining each shipment of the group having the earliest requisite completion time and/or date. In some embodiments, the requisite completion time and/or date may include a specified time at which the given incomplete shipment is scheduled to be shipped as a completed shipment from the order fulfillment center. For instance, such specified time may be the time (and/or date) that the shipment is expected to be at a loading dock to be loaded onto a shipping carrier's truck. For example, given two or more disparate incomplete shipments (all else considered equal), it may be more efficient (with respect to the order or shipment throughput of the order fulfillment center) to assign an overage unit to the shipment that is expected to be shipped before each of the other shipments. As illustrated by block 709, if after the determination of block 708 results in only one shipment, then the method proceeds to block 712. If two or more shipments remain, the method proceeds to block 710.

As illustrated by block 710, the method may include determining the shipments of the having the highest shipment priority designation. In various embodiments, such priority designations may be assigned by a control system (e.g., control system 190 described above) to various shipments within the order fulfillment center. In some embodiments, such priority designations may include shipping priority designations for shipping carriers. For example, a package to be shipped via expedited services (e.g., overnight shipping) may have a higher priority designation than a package to be shipped via standard services (e.g., ground shipping). As illustrated by block 711, if after the determination of block 710 results in only one shipment, then the method proceeds to block 712. If two or more shipments remain, the method proceeds to block 712.

As illustrated by block 712, the method may include applying (in a manner similar to that of blocks 704-710) and of the selection criteria described above with respect to control system 190. If more than two shipments remain in the evaluation the method may also include randomly or pseudo-randomly selecting one shipment of the group. Once a single shipment is determined, the method may include assigning the overage unit being evaluated to the determined shipment (block 714) for sortation.

In other embodiments, other methods may be utilized to assign an overage unit to a given incomplete shipment. FIG. 8 illustrates assigning an overage unit to a shipment via an exemplary score-based method. As illustrated by block 800, the method may include, for a given overage unit of a particular item, dynamically determining that a group of two or more incomplete shipments that each requires at least one unit of the particular item to become a completed shipment.

As indicated by blocks 802 and 808, the portions of the method represented by blocks 804 and 806 may be repeated for each shipment determine in block 900. For each sorting station, the method may include determining one or more subscores each associated with any of the selection criteria (e.g., shipment selection criteria) described above. In some embodiments, each subscore may be weighted (e.g., by a respective weighting value) to determine composite score for a given shipment. In various embodiments, such weighting values (or simply "weights") may each be configurable. For example, a weight may be configurable by a system administrator or dynamically configurable by the control system. For instance, in various embodiments, as conditions within the material handling facility change (e.g., time of day, workload demand, shipment processing capacity, and any other condition of the materials handling facility), the control system may dynamically change the values of various weights in response to such conditions. Each selection criterion may include any one of the various shipment selection criteria described above.

As described above, each subscore may be associated with a shipment selection criterion. As described above, each subscore may be configurable such that it is weighted differently than at least some of the other subscores. In some cases, each subscore may be weighted based on a designated priority. For example, in one embodiment, the subscore associated with whether or not a given shipment is already assigned to a sorting slot may be weighted the most heavily whereas other, less critical criteria may be given smaller weightings.

From each subscore, a composite score for a given sorting station may be determined (block 806). For example, the composite score of a given sorting station may be the sum of the various subscores determined for such station. In other cases, other functions or methods may be utilized to determine the composite score. After a composite score is determined for each shipment, the method may proceed to step 810 where the unit is assigned to the shipment having the highest composite score. Note that other methods for determining a shipment to which to assign or direct an overage unit may be employed. Each of such methods may determine a particular shipment based on any shipment selection criterion or combination of shipment selection criteria (as described above) while remaining within the spirit and scope of various embodiments.

While the methods described above utilize various constraints (such as shipment selection criteria) to determine (for a given overage unit) a sorting station to which the overage unit is to be assigned or directed, any ones of such constraints may be relaxed (or, alternatively, amplified) in various implementations while remaining with the spirit and scope of various embodiments.

Exemplary System

Figure 9:
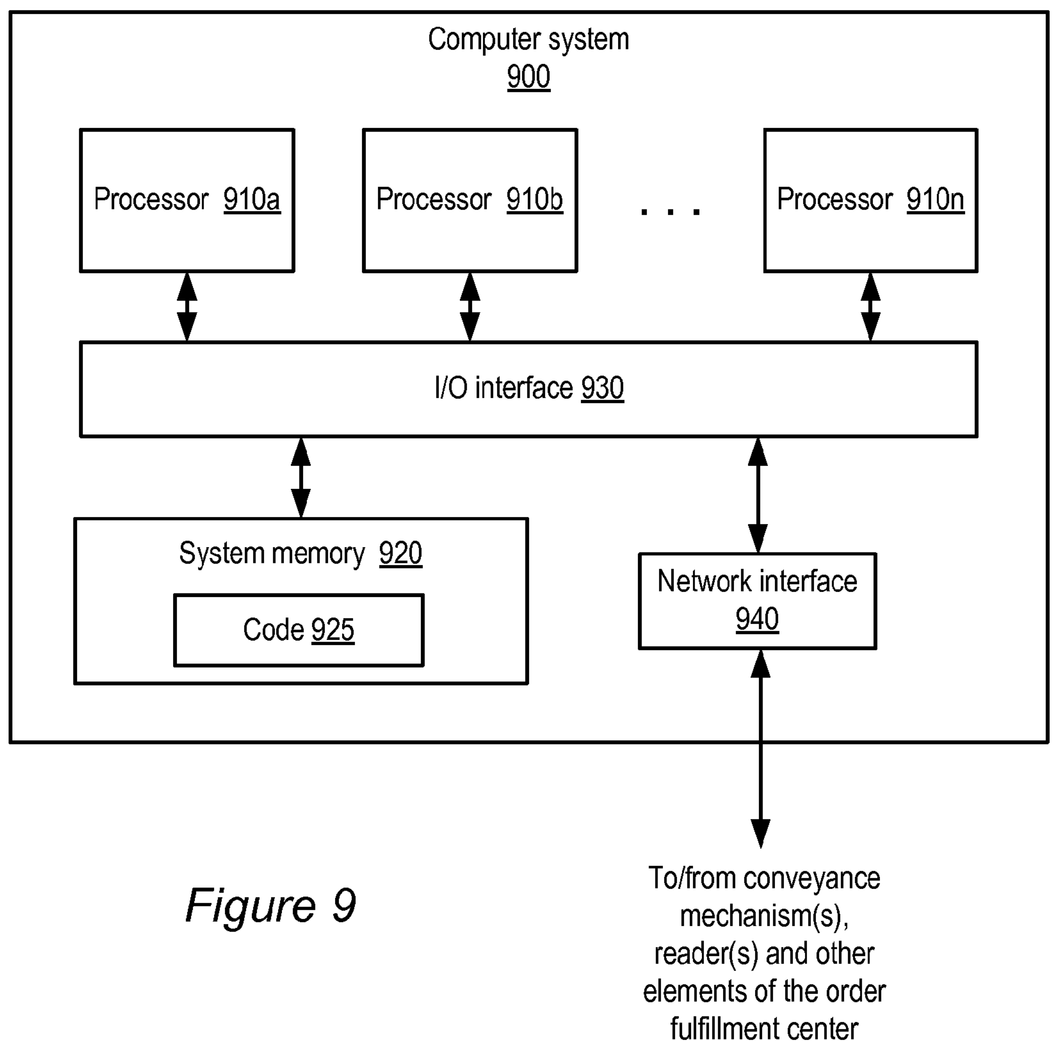
FIG. 9 is a block diagram illustrating an exemplary embodiment of a computer system.

In one embodiment, a system that implements one or more components of a method and apparatus for determining the usability of overage units in a sortation process as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system 190, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems, communications devices, control mechanisms, readers, scanners and so on that are components of the order fulfillment center. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing a control system or other components described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of methods may be changed, and various elements may be added, reordered, combined, omitted, modified, etc.

Various modifications and changes may be made as would be obvious to a person skilled in the art having the benefit of this disclosure. It is intended that embodiments embrace all such modifications and changes and, accordingly, the above description to be regarded in an illustrative rather than a restrictive sense.

What is claimed is:

1. A system, comprising:

a memory storing program instructions; and one or more processors coupled to said memory, wherein said program instructions are executable by at least one of said one or more processors to implement a control system configured to:

for each given unit of a plurality of units of items picked from inventory in an order fulfillment center and conveyed to an induction station of a sortation system, determine whether the given unit is designated to be inducted into the sortation system for sorting units of items into shipments;

while a particular unit of a particular item of said plurality of units remains at the induction station:

determine said particular unit is not designated to be inducted into said sortation system;

determine one or more incomplete shipments that each requires at least one unit of said particular item to become a completed shipment; and in response to the determination of said one or more incomplete shipments, generate an instruction to induct said particular unit into said sortation system for sorting said particular unit as a shipment of said one or more incomplete shipments.

2. The system of claim 1, wherein in response to the determination of said one or more incomplete shipments, the control system is configured to assign said particular unit to a particular incomplete shipment of said one or more incomplete shipments.

3. The system of claim 2, wherein said dynamic determination results in the determination of two or more incomplete shipments that each require at least one unit of said particular item to become a complete shipment; wherein to determine said particular incomplete shipment to which the particular unit is assigned, the control system is configured to select the particular incomplete shipment from said two or more incomplete shipments based on one or more selection criteria.

4. The system of claim 3, wherein at least one criterion of said one or more selection criteria comprises, for each given incomplete shipment of said two or more incomplete shipments, an indication of whether the given incomplete shipment has been assigned to one of a plurality of sorting slots of said sortation system into which units of items are sorted for shipments.

5. The system of claim 3, wherein at least one criterion of said one or more selection criteria comprises, for each given incomplete shipment of said two or more incomplete shipments, an indication of whether a sorting slot for the given incomplete shipment comprises at least one sorted item.

6. The system of claim 3, wherein at least one criterion of said one or more selection criteria comprises, for each given incomplete shipment of said two or more incomplete shipments, an indication of whether the sorting of at least one unit designated to be sorted as part said given incomplete shipment was previously postponed due to insufficient availability of one or more resources of said order fulfillment center.

7. The system of claim 6, wherein said one or more resources comprise a plurality of sorting slots of said sortation system, wherein the indication of whether the sorting of at least one unit designated to be sorted as part said given incomplete shipment was previously postponed due to insufficient availability of one or more resources indicates that the sorting of the at least one unit designated to be sorted as part said given incomplete shipment was previously postponed due to insufficient availability of one of said plurality of sorting slots.

8. The system of claim 3, wherein at least one criterion of said one or more selection criteria comprises, for each given incomplete shipment of said two or more incomplete shipments, an indication of whether the given incomplete shipment is short of a complete shipment by only one unit of said particular item.

9. The system of claim 3, wherein at least one criterion of said one or more selection criteria comprises, for each given incomplete shipment of said two or more incomplete shipments, an indication of an amount of time remaining until a specified time at which the given incomplete shipment is scheduled to be shipped as a completed shipment from said order fulfillment center.

10. The system of claim 3, wherein at least one criterion of said one or more selection criteria comprises, for each given incomplete shipment of said two or more incomplete shipments, an assigned priority designation of the given incomplete shipment.

11. The system of claim 3, wherein at least some of said one or more selection criteria are configurable.

12. The system of claim 3, wherein the control system is configured to select the particular incomplete shipment from said two or more incomplete shipments based on a plurality of individually weighted selection criteria.

13. The system of claim 1, wherein said control system is configured to, while the particular unit remains at the induction station, send said instruction for presentation to an agent.

14. The system of claim 13, wherein the control system is configured to, while the particular unit remains at the induction station, generate said user-interface display on a terminal at an induction station for inducting units into said sortation system.

15. The system of claim 1, wherein to generate said instruction the control system is configured to, while the particular unit remains at the induction station, generate a user-interface display, wherein said user-interface display includes a message indicating that the particular unit is to be inducted into said conveyance mechanism.

16. The system of claim 1, wherein to determine whether the given unit is designated to be inducted into the sortation system, the control system is configured to:

determine an identifier of said given unit, wherein the determination of said identifier of said given unit is dependent upon a determined receptacle identifier in which the unit is located and an item identifier for the given unit, determine whether stored information indicating identifiers of units that have been designated to be inducted into said sortation system includes said identifier of said given unit.

17. The system of claim 1, wherein the control system is configured to, in response to said instruction to induct said particular unit of said particular item, generate an instruction to cancel a pick operation for an other unit of said particular item; wherein said pick operation for said other unit comprises the operation of picking said other unit of said particular item from inventory.

18. The system of claim 1, wherein the control system is configured to:

prior to determining said one or more incomplete shipments that each require at least one unit of said particular item to become a completed shipment, generate an instruction to send said particular unit to an exception handling stage; and while said particular unit resides in the exception handling stage, generate said instruction to induct said particular unit into said sortation system.

19. A computer-implemented method, comprising:

for each given unit of a plurality of units of items picked from inventory in an order fulfillment center and conveyed to an induction station of a sortation system, determining whether the given unit is designated to be inducted into the sortation system for sorting units of items into shipments;

while a particular unit of a particular item of said plurality of units remains at the induction station:

determining said particular unit is not designated to be inducted into said sortation system;

determining one or more incomplete shipments that each requires at least one unit of said particular item to become a completed shipment; and in response to the determination of said one or more incomplete shipments, generating an instruction to induct said particular unit into said sortation system for sorting said particular unit as a shipment of said one or more incomplete shipments.

20. The method of claim 19, wherein the method comprises, in response to the determination of said one or more incomplete shipments, assigning said particular unit to a particular incomplete shipment of said one or more incomplete shipments.

21. The method of claim 20, wherein said dynamic determination results in the determination of two or more incomplete shipments that each require at least one unit of said particular item to become a complete shipment; wherein determining said particular incomplete shipment to which the particular unit is assigned comprises selecting the particular incomplete shipment from said two or more incomplete shipments based on one or more selection criteria.

22. The method of claim 21, wherein at least one criterion of said one or more selection criteria comprises, for each given incomplete shipment of said two or more incomplete shipments, an indication of whether the given incomplete shipment has been assigned to one of a plurality of sorting slots of said sortation system into which units of items are sorted for shipments.

23. The method of claim 21, wherein at least one criterion of said one or more selection criteria comprises, for each given incomplete shipment of said two or more incomplete shipments, an indication of whether a sorting slot for the given incomplete shipment comprises at least one sorted item.

24. The method of claim 21, wherein at least one criterion of said one or more selection criteria comprises, for each given incomplete shipment of said two or more incomplete shipments, an indication of whether the given incomplete shipment is short of a complete shipment by only one unit of said particular item.

25. The method of claim 21, wherein at least one criterion of said one or more selection criteria comprises, for each given incomplete shipment of said two or more incomplete shipments, an indication of whether the sorting of at least one unit designated to be sorted as part said given incomplete shipment was previously postponed due to insufficient availability of one or more resources of said order fulfillment center.

26. The method of claim 25, wherein said one or more resources comprise a plurality of sorting slots of said sortation system, wherein the indication of whether the sorting of at least one unit designated to be sorted as part said given incomplete shipment was previously postponed due to insufficient availability of one or more resources indicates that the sorting of the at least one unit designated to be sorted as part said given incomplete shipment was previously postponed due to insufficient availability of one of said plurality of sorting slots.

27. The method of claim 21, wherein at least one criterion of said one or more selection criteria comprises, for each given incomplete shipment of said two or more incomplete shipments, an indication of an amount of time remaining until a specified time at which the given incomplete shipment is scheduled to be shipped as a completed shipment from said order fulfillment center.

28. The method of claim 21, wherein at least one criterion of said one or more selection criteria comprises, for each given incomplete shipment of said two or more incomplete shipments, an assigned priority designation of the given incomplete shipment.

29. The method of claim 21, wherein the method comprises configuring one or more of said selection criteria.

30. The method of claim 21, wherein the method comprises selecting the particular incomplete shipment from said two or more incomplete shipments based on a plurality of individually weighted selection criteria.

31. The method of claim 19, wherein the method comprises, while the particular unit remains at the induction station, sending said instruction for presentation to an agent.

32. The method of claim 19, wherein to generate said instruction the method further comprises, while the particular unit remains at the induction station, generating a user-interface display, wherein said user-interface display includes a message indicating that the particular unit is to be inducted into said conveyance mechanism.

33. The method of claim 32, wherein the method comprises, while the particular unit remains at the induction station, generating said user-interface display on a terminal at an induction station for inducting units into said sortation system.

34. The method of claim 19, wherein determining whether the given unit is designated to be inducted into the sortation system comprises:

determining an identifier of said given unit, wherein the determination of said identifier of said given unit is dependent upon a determined receptacle identifier in which the unit is located and an item identifier for the given unit, determining whether stored information indicating identifiers of units that have been designated to be inducted into said sortation system includes said identifier of said given unit.

35. The method of claim 19, wherein the method comprises, in response to said instruction to induct said particular unit of said particular item, generating an instruction to cancel a pick operation for an other unit of said particular item; wherein said pick operation for said other unit comprises the operation of picking said other unit of said particular item from inventory.

36. The method of claim 19, wherein method comprises:

prior to determining said one or more incomplete shipments that each require at least one unit of said particular item to become a completed shipment, generating an instruction to send said particular unit to an exception handling stage; and while said particular unit resides in the exception handling stage, generating said instruction to induct said particular unit into said sortation system.

37. A computer-readable storage medium, storing program instructions computer-executable to implement a control system configured to:

for each given unit of a plurality of units of items picked from inventory in an order fulfillment center and conveyed to an induction station of a sortation system, determine whether the given unit is designated to be inducted into the sortation system for sorting units of items into shipments;

while a particular unit of a particular item of said plurality of units remains at the induction station:

determine said particular unit is not designated to be inducted into said sortation system;

determine one or more incomplete shipments that each requires at least one unit of said particular item to become a completed shipment; and in response to the determination of said one or more incomplete shipments, generate an instruction to induct said particular unit into said sortation system for sorting said particular unit as a shipment of said one or more incomplete shipments.

38. The medium of claim 37, wherein in response to the determination of said one or more incomplete shipments, the control system is configured to assign said particular unit to a particular incomplete shipment of said one or more incomplete shipments.

39. The medium of claim 38, wherein said dynamic determination results in the determination of two or more incomplete shipments that each require at least one unit of said particular item to become a complete shipment; wherein to determine said particular incomplete shipment to which the particular unit is assigned, the control system is configured to select the particular incomplete shipment from said two or more incomplete shipments based on one or more selection criteria.

40. The medium of claim 39, wherein at least one criterion of said one or more selection criteria comprises, for each given incomplete shipment of said two or more incomplete shipments, an indication of whether the given incomplete shipment has been assigned to one of a plurality of sorting slots of said sortation system into which units of items are sorted for shipments.

41. The medium of claim 39, wherein at least one criterion of said one or more selection criteria comprises, for each given incomplete shipment of said two or more incomplete shipments, an indication of whether a sorting slot for the given incomplete shipment comprises at least one sorted item.

42. The medium of claim 39, wherein at least one criterion of said one or more selection criteria comprises, for each given incomplete shipment of said two or more incomplete shipments, an indication of whether the given incomplete shipment is short of a complete shipment by only one unit of said particular item.

43. The medium of claim 39, wherein at least one criterion of said one or more selection criteria comprises, for each given incomplete shipment of said two or more incomplete shipments, an indication of whether the sorting of at least one unit designated to be sorted as part said given incomplete shipment was previously postponed due to insufficient availability of one or more resources of said order fulfillment center.

44. The medium of claim 43, wherein said one or more resources comprise a plurality of sorting slots of said sortation system, wherein the indication of whether the sorting of at least one unit designated to be sorted as part said given incomplete shipment was previously postponed due to insufficient availability of one or more resources indicates that the sorting of the at least one unit designated to be sorted as part said given incomplete shipment was previously postponed due to insufficient availability of one of said plurality of sorting slots.

45. The medium of claim 39, wherein at least one criterion of said one or more selection criteria comprises, for each given incomplete shipment of said two or more incomplete shipments, an indication of an amount of time remaining until a specified time at which the given incomplete shipment is scheduled to be shipped as a completed shipment from said order fulfillment center.

46. The medium of claim 39, wherein at least one criterion of said one or more selection criteria comprises, for each given incomplete shipment of said two or more incomplete shipments, an assigned priority designation of the given incomplete shipment.

47. The medium of claim 39, wherein at least some of said one or more selection criteria are configurable.

48. The medium of claim 39, wherein the control system is configured to select the particular incomplete shipment from said two or more incomplete shipments based on a plurality of individually weighted selection criteria.

49. The medium of claim 37, wherein said control system is configured to, while the particular unit remains at the induction station, send said instruction for presentation to an agent.

50. The medium of claim 37, wherein to generate said instruction the control system is configured to, while the particular unit remains at the induction station, generate a user-interface display, wherein said user-interface display includes a message indicating that the particular unit is to be inducted into said conveyance mechanism.

51. The medium of claim 50, wherein the control system is configured to, while the particular unit remains at the induction station, generate said user-interface display on a terminal at an induction station for inducting units into said sortation system.

52. The medium of claim 37, wherein to determine whether the given unit is designated to be inducted into the sortation system, the control system is configured to:

determine an identifier of said given unit, wherein the determination of said identifier of said given unit is dependent upon a determined receptacle identifier in which the unit is located and an item identifier for the given unit, determine whether stored information indicating identifiers of units that have been designated to be inducted into said sortation system includes said identifier of said given unit.

53. The medium of claim 37, wherein the control system is configured to, in response to said instruction to induct said particular unit of said particular item, generate an instruction to cancel a pick operation for an other unit of said particular item; wherein said pick operation for said other unit comprises the operation of picking said other unit of said particular item from inventory.

54. The medium of claim 37, wherein the control system is configured to:

prior to determining said one or more incomplete shipments that each require at least one unit of said particular item to become a completed shipment, generate an instruction to send said particular unit to an exception handling stage; and while said particular unit resides in the exception handling stage, generate said instruction to induct said particular unit into said sortation system.

* * * * *